July 8, 1958 C. S. MORRISON 2,842,077
TUNNEL FORMER AND SUBSOIL INJECTOR
Filed Sept. 14, 1953 2 Sheets-Sheet 1
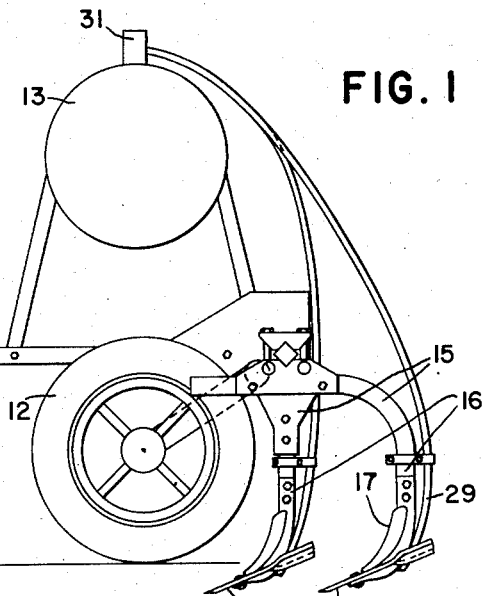
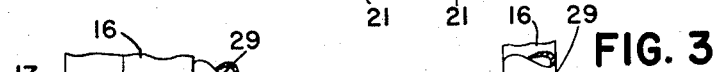
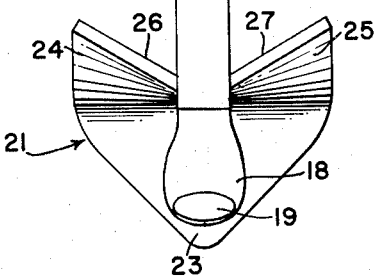
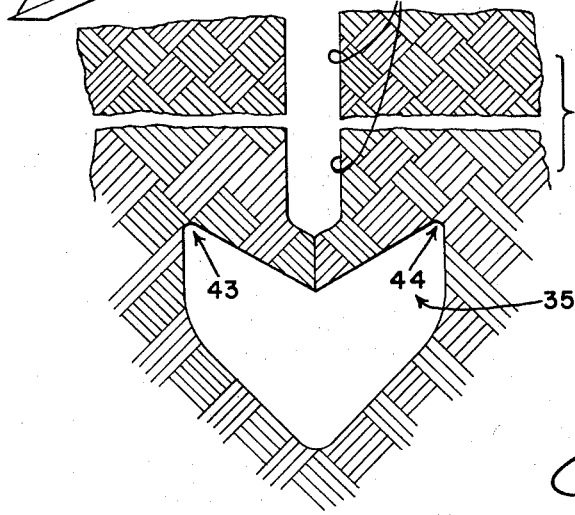
*INVENTOR.*
CHARLES S. MORRISON
*ATTORNEYS*

July 8, 1958 C. S. MORRISON 2,842,077
TUNNEL FORMER AND SUBSOIL INJECTOR
Filed Sept. 14, 1953 2 Sheets-Sheet 2
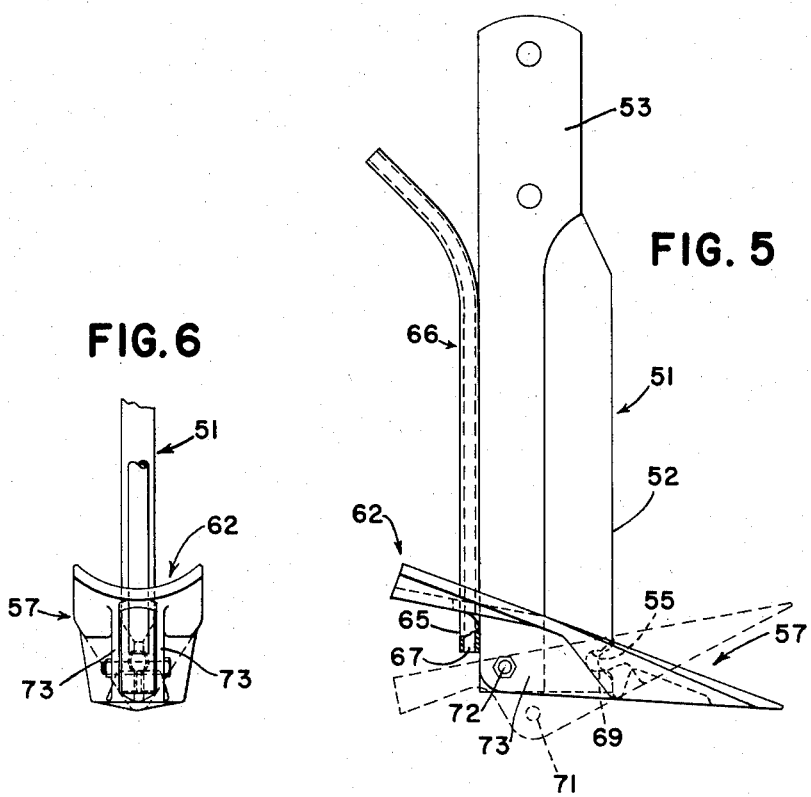
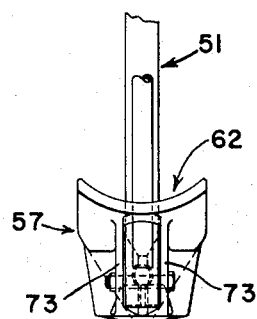
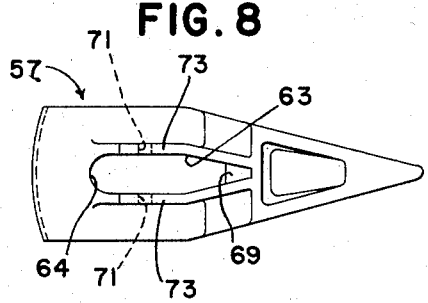
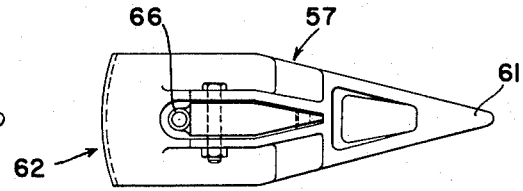
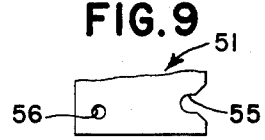
*INVENTOR.*
CHARLES S. MORRISON
BY
*ATTORNEYS*

United States Patent Office 2,842,077
Patented July 8, 1958

2,842,077
TUNNEL FORMER AND SUBSOIL INJECTOR

Charles S. Morrison, Moline, Ill., assignor to Deere & Company, Moline, Ill., a corporation of Illinois Application September 14, 1953, Serial No. 379,941

1 Claim. (Cl. 111—7)

The present invention relates generally to agricultural machines and more particularly to machines having soil-entering means so constructed and arranged to provide for the injection into the soil of fluids for fertilizing and other purposes.

The object and general nature of the present invention is the provision of a tool useful for the introduction of fluid, particularly gaseous fluids, into the soil, with means for forming a closed tunnel or channel underneath the surface of the ground, whereby the retention of the additive material in the soil is assured, even though the material added may be highly volatile. More specifically, it is a feature of this invention to provide means for opening a furrow, tunnel, or channel underneath the surface of the ground for receiving such additive materials as anhydrous ammonia and the like, with new and improved means making it possible to hold the additive material within the tunnel or channel and to prevent its dissipation upwardly to the surface of the ground with consequent wastage and loss of the material.

Still further, it is a feature of this invention to provide an agricultural tool particularly useful in injecting highly volatile fluids and gases into the soil beneath the surface thereof, which tool includes a relatively narrow vertical standard with a tunnel- or channel-forming unit at the lower end thereof and means so constructed and arranged to seal off the lower portion of the opening formed by the passage of the standard through the soil, thus closing the upper portion of the channel and thereby preventing loss or wastage of the additive material upwardly through the opening in the ground formed by the passage of the shank therethrough. Sealing this shank-formed opening at the bottom thereof, according to the principles of the present invention, effectively retains the additive material at the depth desired and, in addition, prevents any loss and dissipation of the material by its passage upwardly into the opening in the soil formed by the shank.

These and other objects and advantages of the present invention will be apparent to those skilled in the art after a consideration of the following detailed description, taken in conjunction with the accompanying drawings in which:

Fig. 1 is a side view of an agricultural implement in which the principles of the present invention have been incorporated.

Fig. 2 is an enlarged fragmentary side view of the channel-forming tool and associated fluid-injecting means in which the principles of the present invention have been incorporated.

Fig. 3 is a rear view of the soil-entering tool shown in Fig. 2.

Fig. 4 is a view of the channel or tunnel formed in the soil after the passage therethrough of the tool shown in Fig. 2, Fig. 4 particularly illustrating the manner in which the upper portion of the channel or tunnel is sealed against loss of vapors and the like from the channel or tunnel.

Fig. 5 is a side view of a modified form of the present invention, which includes a channel-forming shoe of cast construction.

Fig. 6 is a rear view of the lower portion of the shank and shoe shown in Fig. 5.

Fig. 7 is a bottom view of the shank and shoe shown in Fig. 5.

Fig. 8 is a bottom view of the shoe, showing the same detached from the shank.

Fig. 9 is a fragmentary view of the lower end of the shank or standard shown in Fig. 5.

The principles of the present invention have been shown as incorporated in an implement 10 adapted to be drawn along the ground by a conventional farm tractor (not shown). The implement 10 includes a frame 11 supported by ground wheels 12 and carrying a container 13 holding the material, such as anhydrous ammonia, to be injected into the soil. The frame 11 also carries one or more standards 15 to the lower portion of each of which a generally vertically disposed knife shank 16 is fixed, the shank 16 forming the ground-entering means of the standard 15. Each knife shank 16 is sharpened at its forward edge, as at 17, and at its lower end is provided with a foot section 18 that is apertured to receive a fastening rivet, bolt or the like, shown at 19, by which a replaceable point member 21 is fixedly secured to the lower end of the knife shank 16.

In the first form of the invention, the point member 21 comprises a flat plate-like section having a forward sharpened point 23 and fixed to the lower end of the knife shank 16 in a downwardly and forwardly extending plane. The rear portion of the point member is bifurcated, forming two sections 24 and 25 disposed at opposite sides of the shank 16 and at their rear ends are twisted so as to form upwardly and laterally inwardly facing surfaces, 26 and 27, each of these surfaces, as will best be seen from Fig. 2, lying in a plane that extends generally forwardly and downwardly, the upwardly and forwardly facing sections 26 and 27 being disposed generally rearwardly of the shank 16 and generally upwardly above the forward portions or major section of the point member 21. As shown in Fig. 3, the rear sections 26 and 27 lie at opposite sides of the shank 16 and extend laterally outwardly and upwardly from the sides of said shank. The sections 24, 25 are spaced apart, not only to receive the rear portion of the knife shank 16 but also to receive a tube 29 that is fixed in any suitable way to the rear edge of the shank 16 and extends generally upwardly to a control unit 31 of any suitable construction that forms a part of the container 13. The lower end of the tube 29 extends below the bifurcated section 24, 25 and lies generally behind the lower end of the shank 16, the lower end being open as at 32, so that fluid flowing or forced out of the opening 32 is directed downwardly. The upwardly and forwardly facing surfaces 26 and 27, as will be seen from Fig. 2, extend rearwardly of the tube 29. In operation, the implement frame 11 is lowered, as by raising the wheels relative to the frame, and the lower ends of the knife shanks and the associated points 21 enter the ground. As the implement is drawn along the ground surface, the point members 21 form tunnels or channels 35 (Fig. 4) underneath the surface of the ground, and into each of these channels or tunnels the fluid additive flowing from the lower end of the tube 29 enters. Where a volatile or gaseous fertilizing medium, such as anhydrous ammonia, is forced through the tubes 29 and into the channels or tunnels, it is extremely important to prevent the fluid from immediately escaping from the ground up through the opening 40 (Fig. 4) formed in the soil by the passage of the shank 16 therethrough. When the fluid used is anhydrous ammonia, for example, it is normally being maintained under relatively high pressure while in the tank, usually sufficient to maintain the anhydrous ammonia in liquid form, but as soon as the pressure is released, as when the material flows outwardly through the discharge opening 32, the anhydrous ammonia returns to a gaseous state in which it is lighter than air. This is the reason why, in many cases, anhydrous ammonia, or other similar material, frequently escapes from the ground and is lost, thus serving no useful purpose whatsoever. In some cases attempts have been made to close the top of the opening formed by the shank 16, by causing soil particles to tumble into the opening from the top, as through the use of some kind of covering means. This is only partially successful, first, because any soil that does enter the top of the slot 40 is in loose condition and any gas may readily escape or filter therethrough and, secondly, any of the additive material that leaves the channel or tunnel, indicated at 35 in Fig. 4, formed by the tool 21, that escapes upwardly into the slot 40, loses a major part of its efficiency because it is not retained at the proper soil depth. Further, and what is more important, coverers, press wheels and the like cannot be used successfully in growing crops, such as small grain and the like, or in pastures, because of the liklihood of causing injury to the crop. Coverers also tend to gather and accumulate trash and other surface debris. Thus, it is an important aspect of the present invention to provide furrow- or channel-closing means that does not work at or contact the surface of the ground.

By virtue of the upwardly and laterally inwardly facin sections 24 and 25, extending laterally outwardly of and also lying rearwardly of the shank and of the applicator tube 29, the present invention provides means for effectively sealing the shank-formed opening or slot 40 in the soil and, moreover, the sealing action takes place at the lower portion thereof, where the sealing should be done, rather than at the top of the opening 40, since thereby the gas or other additive is substantially one hundred percent retained in the channel or tunnel 41, and at the proper depth to perform the service desired, rather than permitting a substantial portion of the additive material to filter upwardly into the slot 40 and thereby materially dissipated, even though the material might, to some extent, be prevented from dissipating into the atmosphere by a covering of loose soil at the top. The laterally and inwardly arranged faces 26 and 27 exert, in operation, a generally laterally and inwardly directed pressure against the soil so as to force the soil portions at the top of the channel or tunnel 35 into close and self-sealing contact. Further, the shape of the parts 24 and 25 results in pockets 43 and 44 being formed in the upper portion of the tunnel or channel 41 whereby gaseous constituents lighter than air tend to accumulate and thereby be retained even if there were no sealing action performed at the lower portion of the slot 40 formed by the passage of the shank 16 through the ground.

The self-sealing action of the device of the present invention is substantially augmented by the fact that there is usually more moisture in the ground at the depth at which the tool 21 operates than at the surface of the ground, and therefore a sealing action, produced by pressing the two portions of soil on opposite sides of the slot 40 together just at the upper portion of the tunnel 41, is much more effective than would a similar soil-pressure action be performed at the surface of the ground where the soil particles are generally drier.

A second form of the present invention is illustrated, by way of example, in Figs. 5–8. In this form of the invention the knife shank 51 is substantially straight and arranged in a vertical position, and is attachable to any suitable carrier, such as the wheeled support shown in Fig. 1 in the same way that the knife standards 16 are secured thereto. The knife standard 51 is provided with a sharpened edge 52 and an upper portion 53 apertured to receive attaching bolts or the like. The lower end of the knife standard 51 is provided at its forward edge with a notch 55 and at its rear edge with an aperture 56 (Fig. 9). The lower or foot portion of the knife shank or standard 51 receives a furrow opener in the form of a shoe 57 of special construction. Preferably, but not necessarily, the shoe 57 is formed as a casting and has a forward sharpened or pointed end 61 and a rear upwardly concave soil-sealing portion 62. The generally central portion of the shoe member 57 is apertured, as at 63, to receive the lower end of the knife standard 51, the opening being generally elongated, as best shown in Fig. 8, and rounded at its rear end, as indicated at 64. This rounded portion 64 receives and embraces the lower end portion 65 of a discharge tube 66 that is secured, as by welding or the like, to the rear edge of the knife standard 51. The lower end of the tube 66 is open, as indicated at 67.

The shoe member 57, adjacent the forward portion of the opening 63, is formed with a rearwardly extending lug 69, of generally rounded construction as indicated in Fig. 5 and disposed generally adjacent the top of the shoe member 57. The rearwardly extending lug 69 is constructed and arranged to fit snugly in the notch 55, and being disposed adjacent the upper portion of the shoe 57, the shoe may readily be attached to the foot of the standard 51 merely by first inserting the foot portion into the opening 63 with the lug 69 in the recess 55, with the shoe 57 disposed in approximately the position indicated in dotted lines in Fig. 5. Then by swinging the rear end upwardly so that the openings 71, dotted lines, Fig. 5, are brought up into registry with the opening 56 in the shank 51, a fastening bolt 72, or other fastening means, such as a cotter pin or the like may be inserted through the aligned openings to effectively secure the shoe member 57 to the lower end of the standard or shank 51. The openings 71 of the shoe member are formed in laterally spaced apart flange extensions 73 that are a part of the shoe member 57. When thus connecting the shoe member 57 to the lower end of the standard 51, the rear end 64 of the notch 63 clears the lower end 65 of the tube 66, the slot 63 being long enough for this purpose, but when the openings 71 are aligned with the opening 56, the rear rounded portion 64 of the notch 63 is disposed closely adjacent the lower end of the tube 66.

The rounded portion 62 faces upwardly so that, in effect, the rounded or concave portion 62 acts against the soil at the upper portion of the furrow or channel 35 so as to press opposite soil portions together to seal the channel, in substantially the same manner as described above in connection with Fig. 4. Like the form of the invention shown in Figs. 1–3, the shoe member 57 with its upwardly concave or curved portion 62, is formed so that the curved or upwardly diverging faces are disposed in rear of both the shank and the tube and generally above any forward portions of the shoe. Where the point or shoe member 21, Figs. 1–3, is discontinuous across the rear end formed by the twisted sections 24 and 25, the shoe member 57 is smooth and continuous across the rear upwardly curved section 62.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

In an agricultural implement, means for injecting a fluid, such as anhydrous ammonia, normally under pressure sufficient to retain the fluid in the form of a liquid until the pressure is released, into the soil, at which time the pressure is released and the fluid becomes gaseous, said means comprising a relatively narrow soil-penetrating shank, a furrow-forming tool secured to the lower end of said shank, the latter being of such length to dispose the furrow forming tool under but adjacent the surface of the ground, said tool being wider than said shank so as to form a tunnel in the soil underneath but adjacent the surface of the ground, means carried by the shank for directing the fluid to be injected into said tunnel, and means providing upwardly and laterally inwardly facing surfaces on the rear upper portion of said tool, said surfaces lying rearwardly of and laterally outwardly of the shank and disposed in a position to act against the soil at the upper portion of the tunnel and press the soil generally laterally inwardly and upwardly to close the opening in the soil made by the passage of said shank therethrough.

References Cited in the file of this patent

UNITED STATES PATENTS

| | | |
|---|---|---|
| 25,114 | Hammond | Aug. 16, 1859 |
| 31,771 | Ballard et al. | Mar. 26, 1861 |
| 74,885 | Bradley | Feb. 25, 1868 |
| 257,899 | Spiller | May 16, 1882 |
| 911,645 | Christian | Feb. 9, 1909 |
| 921,487 | Villard | May 11, 1909 |
| 1,120,859 | Storie | Dec. 15, 1914 |
| 1,250,472 | Kirkpatrick et al. | Dec. 18, 1917 |
| 1,273,694 | Tyson | July 23, 1918 |
| 1,284,162 | Tyson | Nov. 5, 1918 |
| 2,439,743 | McEwen | Apr. 13, 1948 |
| 2,598,121 | Hannibal | May 27, 1952 |
| 2,619,054 | Bell | Nov. 25, 1952 |
| 2,625,870 | Peacock et al. | Jan. 20, 1953 |